Feb. 2, 1960 K. R. JONES 2,923,892
FREQUENCY MODULATED OSCILLATOR WITH DISTORTION CANCELLATION
Filed May 19, 1958
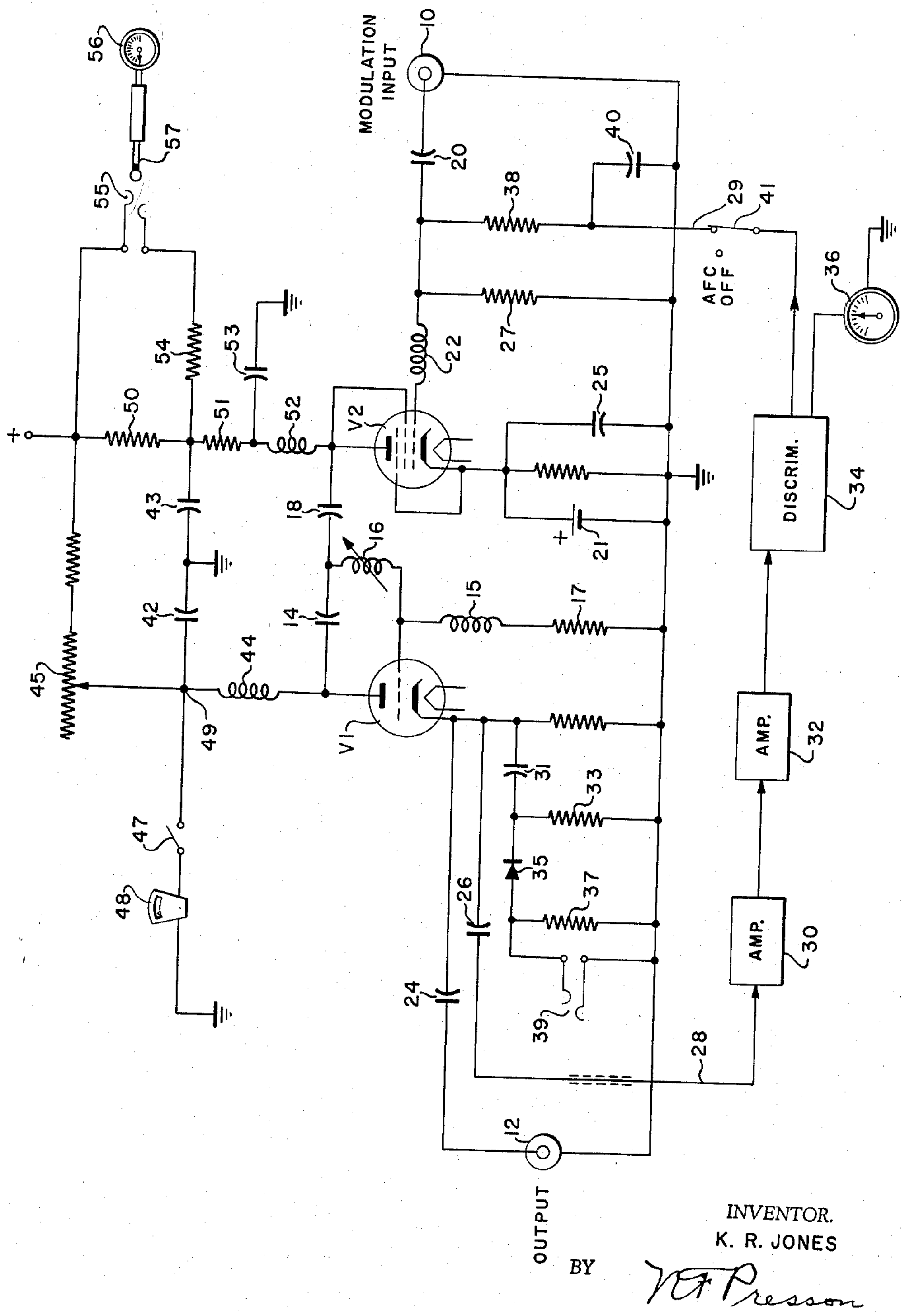
INVENTOR.
K. R. JONES
BY V. F. Presson
ATTORNEY United States Patent Office 2,923,892
Patented Feb. 2, 1960

2,923,892

FREQUENCY MODULATED OSCILLATOR WITH DISTORTION CANCELLATION

Kenneth R. Jones, Lindenhurst, N.Y., assignor to The Western Union Telegraph Company, New York, N.Y., a corporation of New York Application May 19, 1958, Serial No. 736,210

7 Claims. (Cl. 332—18)

This invention relates to a low distortion FM modulator circuit, and more particularly to a novel and improved modulator particularly adapted for use with microwave and ultra high frequency radio communication systems.

In the design of an existing microwave relay system employed by a telegraph company for communication purposes, it was found necessary to adopt extraordinary measures for the reduction of intermodulation distortion that tends to occur between the multiplicity of telegraph channels carried by the system. Such a system is disclosed in an article by G. G. Gerlach, entitled "A Microwave Relay Communication System," published in the RCA Review of March 1946, vol. 7, No. 1, and also in an article by H. P. Corwith and W. B. Sullinger, entitled "Western Union's Microwave Relay System," published in the Western Union Technical Review of July 1948, vol. 2, No. 3. The system disclosed in the foregoing publications employs a first frequency-modulated intelligence band 150 kc. wide on a 1-mc. subcarrier and this subcarrier frequency modulates a 4000-mc. transmitter oscillator. In order to meet the low distortion requirements, the modulator is a balanced affair comprised of two identical reactance modulators and oscillators, each followed by frequency multipliers. A very high order of identity for each of these three opposing elements was necessary in order to secure the desired balance in initial manufacture, and frequent adjustments of several complex controls are necessary in order to maintain the balance as vacuum tubes and other equipment age or as replacements are made in the course of repair. Furthermore, when adjusting for a high order of balance, the quantity being measured is so small that complex and costly equipment is required and extraordinary care must be employed in the adjusting procedure.

In accordance with the instant invention there is provided a relatively simple type of modulator that not only reduces distortion beyond that obtainable with the existing equipment, but also is very simple to adjust initially by means of ordinary instruments, such as a milliammeter or microammeter, and requires but little attention to maintain this condition in service.

It is an object of the present invention to provide a modulator circuit which substantially reduces distortion, and in which it is not necessary to obtain or retain a high order of balance between the modulator elements.

A further object is to provide a modulator of the foregoing character which is simple to adjust initially and which requires but little attention to maintain the proper adjustment in service.

Still another object is to provide a modulator in which low distortion is achieved without resort to the balanced pair design of the prior system, and in which frequency multipliers are eliminated.

These and other objects and advantages of the invention will be apparent from the following detailed description of an illustrative embodiment thereof, taken in connection with the accompaniyng drawing which discloses a low distortion modulator circuit suitable for use with a microwave or ultra high frequency transmission system.

Referring to the drawing there is shown, by way of illustration, a 41-mc. oscillator triode V1, and a resistance modulator tube V2 which serves to vary the frequency of the oscillator between the limits of 40.6 and 41.4 mc. in response to a 400 c.p.s. to 500 kc. input intelligence signal applied to a modulation input coaxial jack 10. Preferably the oscillator is a 6J4 tube and the modulator a 6AG5 tube, although other types of tubes suitable for the purpose may be employed. Jack 10 is connected by means of a coupling capacitor 20 and an RF choke coil 22 to the control grid of the resistance modulator V2 which, as shown, is connected as a triode. A source of biasing potential 21 is inserted in the cathode circuit of tube V2 in order to prevent degeneration which, if present, would cause unequal automatic frequency control correction. A capacitor 25 is for audio frequency bypass purposes.

A capacitor 14 and a variable inductance 16 comprise the oscillator tank circuit; the capacitor 14 has two functions: (1) to complete the oscillator tank circuit, and (2) to provide a path for negative feedback of modulating frequencies 180° out of phase with the input modulating frequencies. Thus, the tube V1 functions as a radio frequency oscillator and also as an audio frequency amplifier. The radio frequency oscillator range may be within 30 mc. to 100 mc., but preferably is near the lower frequency to reduce the effects of lead lengths and RF coupling, chassis RF hot spots, and the like. The frequency modulated output from the cathode of tube V1 is coupled by means of a capacitor 24 to a coaxial output jack 12, and the modulator output is then heterodyned against a source of constant frequency in known manner. For example, a 42 mc. crystal-controlled oscillator may be employed, and the 1 mc. difference frequency amplified and coupled to a coaxial transmission line to thereby supply a 1 mc. subcarrier frequency. Deviations resulting from modulation of plus or minus 400 kc., equal to plus or minus 40% of the center frequency of 1 mc., are normally obtainable.

Also connected to the cathode of the oscillator tube, by means of a capacitor 26 and conductor 28 is an automatic frequency control circuit of known type comprising amplifiers 30 and 32, and a discriminator 34, the D.C. output of the discriminator 34 being connected by conductor 29 to the modulation input circuit through a resistor 38. A capacitor 40 prevents any remaining audio output from the discriminator from affecting the grid of the reactance tube V2. The rectified audio output of the discriminator is applied to a meter 36 to indicate the amount of carrier swing due to modulation; the D.C. output of the discriminator indicates the mean oscillator frequency. A resistor 27 provides a potential of zero volts when the AFC circuit is momentarily opened, as by a switch 41, to prevent the control grid of V2 from assuming the potential of its nearest element in the tube.

It is a novel condition of the resistance modulator shown that for minimum distortion the anode current of the reactance tube V2 must bear a specified ratio to the RF output power level of the oscillator tube V1. These two quantities are measured by first switching a microammeter 56 to connect with the circuit of a jack 55 to measure the plate current of the tube V2, and noting the meter indication. As illustrated, the meter may be connected by means of a plug 57 inserted into the jack 55. The meter is then disconnected and its plug 57 inserted in a jack 39 connected, through a rectifier 35, across the output of the oscillator V1, and a second meter reading is noted. It will be understood that instead of employing a plug and jack arrangement, the meter 56 may be alternately connected, as by means of a double-pole double throw switch, to the circuits of jacks 55 and 39, or by any other suitable switching arrangement. By adjustment of a series resistor 45 the output of the oscillator V1 may be adjusted until the foregoing specified ratio of the two meter readings is obtained, which will produce minimum distortion of the modulating frequencies in the modulator circuit. The microammeter 56 which initially is connected to the circuit associated with the jack 55 may have a range, for example, of 0–200 scale reading, and ordinarily in the embodiment illustrated will measure approximately 80 microamperes indicative of a plate current value of V2 of approximately 8 milliamperes.

Resistors 50 and 54 are metering resistances and are selected to cause the minimum disturbance to the operating circuit of V2 when the instrument 56 is connected and disconnected. Resistor 51 is the plate resistor for V2 and the choke coil 52 is for RF isolation. The capacitors 42, 43 and 53 comprise RF and AF bypass paths to ground. When the meter 56 is connected to the circuit associated with jack 39, the desired specified ratio is represented, for example, by a reading of 40 microamperes or approximately one-half that of the reading of the plate current of V2, but the metering resistors 50, 54 and 33, 37 can be given values such that the meter 56 can be caused to produce the same scale reading in either of the test positions when the series resistance 45 is adjusted for minimum distortion.

When distortion is encountered in the radio system, as discerned by appreciable cross-talk between voice bands, the source of distortion may readily be isolated by measurement at a test point 49 by means of an external distortion measuring instrument 48 which may be temporarily connected, as by a switch 47, to the test point 49 in the plate circuit of the oscillator tube V1, on the far side of the radio frequency choke 44. At this point the frequency modulation process has been effected in its entirety and the signal measured represents the quality of the frequency-modulated signals transmitted. The instrument 48 may comprise a wave analyzer which operates as a frequency selector voltmeter that can be tuned as low as 15 kc. and up to the second, third and higher harmonics. Test tones may be applied to the input jack 10 at an amplitude of, for example, 0.3 v. R.M.S. or less and at frequencies of 500 kc. or less. The amplitude of the fundamental frequency of a test tone and the amplitudes of its harmonics may be measured at test point 49.

The effect produced by the adjustment of the resistor 45 is to provide a correcting voltage which is equal in amplitude and 180° out of phase with the original frequency. Since resistor 45 adjusts the plate voltage present at the tube V1, the gain of the tube varies accordingly. As the tube V1 ages, resistance 45 may be adjusted to overcome the loss in gain, by reference to the original value recorded by meter 56 for low distortion. Since the V1 stage is also operated as an oscillator, its frequency is subject to the plate and control grid variations induced by the modulation frequencies. In the system illustrated the second harmonic content measured will ordinarily be minus 50 db below the fundamental frequency, and the frequency deviation resulting is also linear to the same degree.

As the FM oscillator output power level is adjusted over a wide range, it will be found that a unique best adjustment is reached which produces a minimum level of second harmonic. This adjustment will have some effect upon third harmonic distortion, but the latter distortion remains at a very low level and is substantially constant throughout the range of adjustment. As a reason for the superior performance of this modulator, it is evident that a cancellation of distortion products as produced in the oscillator and reactance tubes, respectively, occurs. As is well known, the characteristics of vacuum tubes are not perfectly linear and especially when such tubes are operated over a substantial portion of their characteristics, and it is also evident that a 180°-phase inversion occurs as the signal passes from the anode of reactance tube V2 to the anode of the oscillator tube V1. Therefore, when the oscillator tube is adjusted to produce even harmonic distortion components of the same magnitude as those produced in the reactance tube, they will substantially cancel and reduce distortion to a negligible minimum at the output terminal.

The ability of the tube V1 functioning as an oscillator is closely related to its performance as an amplifier, and therefore when control 45 is adjusted to produce a known output value as an oscillator it is also set for a certain amplifier gain which is that required to produce cancellation of the harmonics present at the anode of the stage V2. Initially the wave analyzer 48 is connected, by closure of the switch 47, when the tubes V1 and V2 are inserted to ascertain whether the level of the second harmonic compared to the level of the fundamental modulating frequency is sufficiently attenuated. Control 45 is adjusted for minimum second harmonic distortion which usually will be 50 db or more below the level of the fundamental modulating frequency. Thereafter the meter reading at jack 39 will give an indication of any change in the mutual conductance of V1 due to service and it may be restored to the original value and hence to the low distortion level obtained when first placed in service by an adjustment of the control resistance 45. As to V2 it should be replaced when its original value, as determined at jack 55, drops to 90% or less. In lieu of utilizing a wave analyzer, the instrument 48 may comprise a calibrated oscilloscope connected to two filters, one of which filters passes the fundamental modulating frequency and the other passes only the harmonics of the modulating frequencies. The ratio, as viewed on the oscilloscope, between the output of the first filter and that of the second filter, will give a reliable indication of the correct setting for control 45.

While the disturbing harmonic is effectively cancelled in the manner above stated, the fundamental frequency always has approximately 20 db of negative feedback by reason of the action of tube V1, and the residual hum and fluctuation noise of the tubes is decreased by this amount and results in a very low residual noise level. The adjustment of control 45 varies the negative feedback value approximately 1 db and the fundamental frequency level therefore is only slightly affected as control 45 is adjusted for the minimum second harmonic level. The shunt resistance presented by V2 varies directly as the modulation impressed on its grid. The resistance variation at the anode of V2 is held to a substantially linear excursion when the input power level of the modulating frequencies is −10 dbm or less. An indication of the high sensitivity of the present system will be observed from the fact that an input power level of −10 dbm produces peak frequency deviation of ±400 kc.s. of the carrier frequency.

In FM systems when distortion levels increase it is usually a question of which end is causing the trouble. The arrangement described herein enables quick isolation of transmitter or receiver trouble by virtue of the test point 49 which will show the fundamental level as well as harmonic levels without requiring the use of receiving apparatus normally employed for transmission and reception of the signals.

An important advantage of the system is that it is not necessary to employ frequency multiplier amplifier stages to achieve the desired wide frequency deviation, and which when used tend to cause non-linear phase shift of modulating frequencies, particularly above 50 kc., nor does the system employ push-pull modulator tubes which require very high orders of balancing, sensitivity and phase characteristics.

A hereinbefore set forth, the maintenance of the relationship between the two meter readings can be facilitated in different ways; for example, the meter can be caused to show identical readings for the optimum adjustment, or if desired, a differential meter can be used and arranged to provide a zero indication for the optimum condition. The quantities to be measured are measurable by simple D.C. instruments and are at appreciable levels, and hence the measuring instruments are inexpensive and the technique very simple. In contrast with the complex and cumbersome modulator system of the prior type, the present modulator will operate at full capacity frequency swing with approximately 20 db less distortion and it can be maintained in this condition by infrequent adjustment of the single control 45. While the embodiment has been illustrated in connection with the microwave system, and operates at a subcarrier frequency of 41 mc. it is to be understood that the same superior performance is obtainable at any practicable frequency.

Various modifications of the system illustrated, and various equivalents or substitutes for the devices depicted, may occur to those versed in the art without departing from the spirit of the invention which therefore is not to be regarded as limited except as indicated by the scope of the appended claims.

What is claimed is:

1. A low distortion frequency modulator circuit comprising a modulator tube and an oscillator tube each having anode, cathode and control grid elements, a source of anode potential for said tubes, means for applying a source of input intelligence signals comprising modulating frequencies to the control grid of the modulator tube, a tank circuit for said oscillator tube comprising a capacitor and an inductance connected in series, means including a capacitor for coupling the anode of the modulator tube to a point between said capacitor and inductance of the tank circuit for frequency-modulating the oscillator, said capacitor in the tank circuit being connected to the anode of the oscillator tube to also provide a path for negative feedback of modulating frequencies approximately 180° out of phase with the modulating frequencies present at the anode of the modulator tube, a control resistor in circuit with said source of anode potential for the oscillator tube, said control resistor being adjustable to vary the gain of the oscillator tube to provide a correcting voltage which is substantially equal in amplitude and 180° out of phase with said modulating frequencies present at the anode of the modulator tube to substantially effect cancellation of distortion products as produced in the modulator and oscillator tubes, respectively.

2. A modulator circuit in accordance with claim 1, including means for obtaining measurements, respectively, of the anode current of the modulator tube and the radio frequency power output of the oscillator tube, and said control resistor is adjustable to produce a ratio of said anode current to said power output which causes the second harmonics of the fundamental modulating frequencies to be reduced to a negligible level.

3. A modulator circuit in accordance with claim 1, including a test point for localizing the origin of distortion products in a frequency-modulated transmission system, said test point being connected through a radio frequency choke coil to the anode of the oscillator tube, said choke coil being characterized in that it offers high impedance to the oscillator radio frequency energy but permits the modulating frequencies to pass for measurement of their amplitude and frequency after the frequency modulation process.

4. A modulator circuit in accordance with claim 2, including means for rectifying a portion of the energy in the output circuit of the oscillator to provide a metering indication of the ability of the oscillator tube as an amplifier and thereby obtain a measurement representing said power output.

5. A modulator circuit in accordance with claim 4, including a capacitor in series with said rectifier means to couple a predetermined amount of the energy of the oscillator to the measuring circuit.

6. A modulator circuit in accordance with claim 3 in which said test point is located in the circuit at a place such that the level of the modulating frequencies and also the amplitude of the harmonics of the modulating frequencies in the transmitted frequency-modulated signals may be observed on a measuring instrument connected to said test point while said control resistor is adjusted to a position to minimize said harmonics.

7. A low distortion frequency modulator circuit in which frequency multiplying stages or push-pull reactance modulator stages are not required in order to achieve frequency deviation of at least plus or minus 400 kc. with distortion levels at least 50 db below the amplitude of the modulating frequencies, said circuit comprising a resistance modulator tube and an oscillator tube each having anode, cathode and control grid elements, a source of anode potential for said tubes, means for applying a source of input intelligence signals comprising modulating frequencies to the control grid of the modulator tube, a tank circuit for said oscillator tube comprising a capacitor and an inductance connected in series, means including a capacitor for coupling the anode of the modulator tube to a point between said capacitor and inductance of the tank circuit for frequency-modulating the oscillator to produce a deviation of at least plus or minus 400 kc. from the unmodulated value of the oscillator basic frequency, said capacitor in the tank circuit being connected to the anode of the oscillator tube to also provide a path for negative feedback of modulating frequencies approximately 180° out of phase with the modulating frequencies present at the anode of the modulator tube, a resistor in circuit with said source of anode potential for the oscillator tube, said resistor being adjustable to vary the gain of the oscillator tube to provide a correcting voltage which is substantially equal in amplitude and 180° out of phase with said modulating frequencies present at the anode of the modulator tube to substantially effect cancellation of distortion products as produced in the modulator and oscillator tubes, respectively.

References Cited in the file of this patent

UNITED STATES PATENTS

| | | |
|---|---|---|
| 2,419,527 | Bartelink | Apr. 29, 1947 |
| 2,548,635 | Summerhayes | Apr. 10, 1951 |
| 2,708,746 | Shaw | May 17, 1955 |